(12) United States Patent
McGatha et al.

(10) Patent No.: US 7,721,198 B2
(45) Date of Patent: May 18, 2010

(54) STORY TRACKING FOR FIXED LAYOUT MARKUP DOCUMENTS

(75) Inventors: Jesse D. McGatha, Sammamish, WA (US); Eric S Leese, Seattle, WA (US); Ahmet Gurcan, Mercer Island, WA (US); Ming Liu, Redmond, WA (US); Rodrigo Lopez, Bellevue, WA (US); Khaled S Sedky, Sammamish, WA (US); Oliver H Foehr, Mercer Island, WA (US); Jerry Dunietz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 11/275,853

(22) Filed: Jan. 31, 2006

(65) Prior Publication Data

US 2007/0180357 A1   Aug. 2, 2007

(51) Int. Cl.
*G06F 17/00* (2006.01)

(52) U.S. Cl. .................... 715/241; 715/249; 715/273

(58) Field of Classification Search .............. 715/241, 715/242, 249, 243, 273
See application file for complete search history.

(56) References Cited

U.S. PATENT DOCUMENTS

| | | | | |
|---|---|---|---|---|
| 5,983,227 A * | 11/1999 | Nazem et al. | | 707/10 |
| 6,038,573 A | 3/2000 | Parks | | |
| 6,199,082 B1 | 3/2001 | Ferrel et al. | | |
| 6,230,173 B1 * | 5/2001 | Ferrel et al. | | 715/205 |
| 6,671,854 B1 * | 12/2003 | Dunsmoir et al. | | 715/207 |
| 6,771,801 B1 * | 8/2004 | Fisher et al. | | 382/112 |
| 6,826,727 B1 | 11/2004 | Mohr et al. | | |
| 7,047,033 B2 * | 5/2006 | Wyler | | 455/552.1 |
| 7,051,276 B1 | 5/2006 | Mogilevsky et al. | | |
| 7,103,838 B1 * | 9/2006 | Krishnamurthy et al. | | 715/202 |
| 7,120,868 B2 | 10/2006 | Salesin et al. | | |
| 7,178,101 B2 | 2/2007 | Tunning | | |
| 2001/0014899 A1 | 8/2001 | Fujikawa | | |
| 2001/0047373 A1 * | 11/2001 | Jones et al. | | 707/515 |
| 2003/0229845 A1 | 12/2003 | Salesin et al. | | |
| 2004/0003097 A1 * | 1/2004 | Willis et al. | | 709/228 |
| 2004/0006742 A1 | 1/2004 | Slocombe | | |
| 2004/0049512 A1 * | 3/2004 | Kawakita | | 707/100 |
| 2004/0070607 A1 | 4/2004 | Yalovsky et al. | | |
| 2004/0164542 A1 * | 8/2004 | Crawford | | 281/22 |
| 2004/0194035 A1 | 9/2004 | Chakraborty | | |

(Continued)

FOREIGN PATENT DOCUMENTS

WO    WO03098370 A2    11/2003

OTHER PUBLICATIONS

Berleant, Daniel, "Models for Reader Interaction Systems", CIKM '00: Proceedings of the Ninth International Conference on Information and Knowledge Management, Nov. 2000, pp. 127-133.*

(Continued)

*Primary Examiner*—Laurie Ries
(74) *Attorney, Agent, or Firm*—Lee & Hayes, PLLC (57) ABSTRACT

Techniques relating to story tracking for fixed layout markup documents are described. In one instance, a process identifies stories contained in a fixed layout markup document. The process also determines which portions of the fixed layout markup document relate to an individual story.

18 Claims, 6 Drawing Sheets

U.S. PATENT DOCUMENTS

| | | | |
|---|---|---|---|
| 2004/0239681 A1* | 12/2004 | Robotham et al. | 345/581 |
| 2005/0203800 A1* | 9/2005 | Sweeney et al. | 705/14 |
| 2006/0061806 A1* | 3/2006 | King et al. | 358/1.15 |
| 2006/0224952 A1 | 10/2006 | Lin | |
| 2007/0038643 A1* | 2/2007 | Epstein | 707/10 |
| 2007/0136659 A1 | 6/2007 | Adelberg et al. | |

OTHER PUBLICATIONS

Cheung, Lawrence Y.L, et al, "A Preliminary Study of Lexical Density for the Development of XML-based Discourse Structure Tagger", downloaded from http://www.rcl.cityu.edu.hk/publications/papers/NLPRS2001_Cheung.pdf, 2001, pp. 1-8.*

Hearst, Marti A., "TextTiling: Segmenting Text Into Mult-paragraph Subtopic Passages", Xerox PARC, 1997 Association for Computational Linguistics, 1997, downloaded from http://acl.Idc.upenn.edu/J/J97/J97-1003.pdf, pp. 33-64.*

Badros et al., "A Constraint Extension to Scalable Vector Graphics", May 2-5, 2001, pp. 1-10.

Bos et al., "Frame-based layout via Style Sheets", WC3 , Jun. 1996, pp. 1-9.

Chao et al., "Layout and Content Extraction for PDF Documents", DAS2004, Florence, Italy, Sep. 8-10, 2004, 12 pgs.

Liang et al., "Document Layout Structure Extraction Using Bounding Boxes of Different Entities", Proceedings of the 3rd IEEE Workshop on Applications of Computer Vision (WACV '96), Dec. 2-4, 1996, pp. 278-283.

* cited by examiner

STORY TRACKING FOR FIXED LAYOUT MARKUP DOCUMENTS

BACKGROUND

In some instances a document, such as an essay or a memorandum, may be thought of as a single individually readable block of data or "story". In the context of an essay or memorandum the story generally flows in a linear fashion from the front or beginning of the document to the back or end of the document. In other instances, a document may contain more than one story. In some such cases the stories may be arranged in a consecutive manner, such that an entirety of a first story is presented and then an entirety of a second story is presented. In other instances, such as in a newspaper or magazine scenario, the stories may be presented as interposed fragments of stories or story fragments.

Modern documents are often defined using a markup language such as XML or HTML and described as markup documents. Modern documents may also be classified as fixed layout documents or adaptive documents. Adaptive documents re-layout the contents of the document based on the desired overall size of the content, such as a single sheet of paper or the size of a display window. Fixed layout documents describe where each discrete unit of a page's content, such as an image or a single run of text, is positioned on the page. Fixed layout documents are also frequently markup documents. The XML Paper Specification (XPS) describes one such document format (the XPS Document format) that is a fixed layout document and also a markup document.

Fixed layout markup document formats, such as the XPS Document format, define a document as a set of markup elements. Individual markup elements define portions of document content and a location where the content should be displayed within the document. Fixed layout markup document formats do not natively handle structural information relating to the document's markup; such as to recognize that a particular portion of the markup relates to a particular story. Accordingly, fixed document formats do not readily distinguish between multiple stories within a document.

SUMMARY

Techniques relating to story tracking for fixed layout markup documents are described. In one instance, a process identifies stories contained in a fixed layout markup document. The process also determines which portions of the fixed layout markup document relate to an individual story.

In another scenario, a system includes a programmed application configured to generate a fixed layout markup document comprising a set of content markup elements. The individual content markup elements specify document content and associated positional data for the document content relative to the fixed layout markup document. The system also includes a document story module configured to identify a story comprising a portion of the content.

DETAILED DESCRIPTION

Overview

Techniques relating to tracking stories contained in fixed layout markup documents are described. A story can simply be thought of as an individually readable block of content. In some scenarios a document may contain multiple stories. Newspapers and magazines provide easily recognizable analogies in that a single newspaper or magazine contains multiple stories or articles. A story can be spread across multiple pages and several stories can share the same page. Individual stories are often displayed within the newspaper or magazine as a series of story fragments which are interposed with other story fragments and/or other content to achieve a specific layout of the newspaper or magazine. Story fragments are grouping elements that can be identified as parts of stories.

Fixed layout documents based on a markup language utilize a set of markup elements (hereinafter "content markup") to define portions of the document's content and various properties associated with the content, such as a specific location where the content portions appear within the fixed layout markup document. The content markup includes markup elements that can define a document sufficiently that a representation of the fixed layout markup document can be generated. For instance, the representation can be displayed on a monitor or printed as a hardcopy. While the content markup is sufficient to generate an intended representation of the content within the fixed layout markup format, the content markup falls short in other scenarios. For instance, in these fixed layout markup documents a sequence of the markup elements of the content markup does not necessarily match the expected structural order of the document. So for example, a markup order of the content markup may not correspond to a reading order of the fixed layout markup document. Similarly, the content markup does not convey information that the document may contain one or more stories. Some of the techniques described below employ a second set of markup or structural markup which references the content markup and which conveys information about stories contained in the document.

The examples described below are provided in a context of page-based fixed layout markup documents which are easily illustrated for purposes of explanation. A page-based fixed layout markup document is divided into pages or 'page parts' and content markup is defined as occurring at a specific address or location on an individual page. The techniques are equally applicable to other fixed layout markup document configurations.

In summary, techniques are described for identifying stories contained in a fixed layout markup document. Further, techniques are described that identify story fragments making up each story and identify on what page individual story fragments appear. The techniques also identify the story fragments contained on an individual page and a reading order of those story fragments.

Exemplary Techniques

Figure 1:
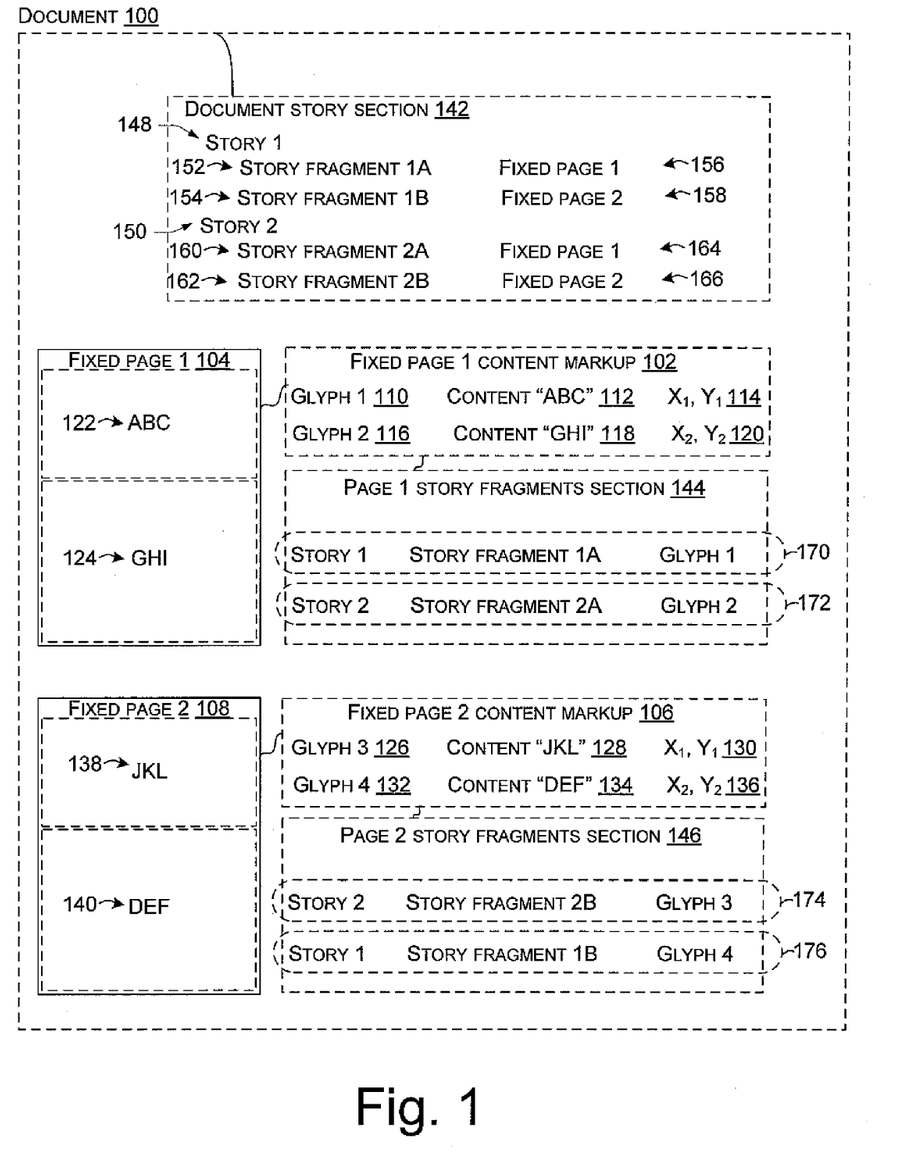
FIGS. 1-3 illustrate fixed layout markup documents configured to track document stories in accordance with one implementation.

FIG. 1 illustrates a fixed layout markup document 100 which identifies and tracks stories contained within the document in accordance with one implementation. In this example, fixed layout markup document 100 is a page-based fixed layout markup document. Suitable document formats for creating fixed layout markup document 100 can include HTML and XML, among others, as will become apparent from the description below.

A fixed layout markup document can include a first set of markup hereinafter referred to as content markup. The content markup conveys content of the document sufficiently that a representation of the document can be generated from the content markup. In this example the content markup is manifested as fixed page 1 content markup 102 relating to a fixed page 1 designated as 104 and fixed page 2 content markup 106 relating to fixed page 2 which is designated as 108. The fixed page 1 content markup 102 contains the content and related information from which fixed page part 1 (104) can be generated by a fixed layout markup format application or document producer. Similarly, the fixed page 2 content markup 106 contains the content and related information from which fixed page part 2 (108) is generated by the document producer. Techniques for conveying the content of the fixed layout markup document with the content markup should be known to the skilled artisan. As such, the discussion below addresses the content markup in a simplified manner which does not describe all of the information which may be contained in the content markup.

In this example, fixed page 1 content markup 102 contains two markup elements representing runs of text called glyphs which convey content which is intended to be displayed for a user. Glyph 1 indicated at 110 conveys content "ABC" indicated at 112 and associated positional data $X_1, Y_1$ as indicated at 114. The positional data indicates where the content ABC should be displayed on fixed page 1 for the user. Similarly, Glyph 2 indicated at 116 conveys content "GHI" as indicated at 118 and associated positional data $X_2, Y_2$ as indicated at 120. Glyph 1's content "ABC" is illustrated on fixed page 104 as designated at 122 while Glyph 2's content GHI is illustrated on the fixed page at 124.

Similarly, fixed page 2 markup 106 contains two glyphs. Glyph 3 indicated at 126 conveys content "JKL" indicated at 128 and associated positional data $X_1, Y_1$ as indicated at 130. The positional data indicates where the content should be displayed on fixed page 2 for the user. Glyph 4, indicated at 132, conveys content "DEF" as indicated at 134 and associated positional data $X_2, Y_2$ as indicated at 136. Glyph 3's content "JKL" is illustrated on fixed page 108 as designated at 138 while Glyph 4's content "DEF" is illustrated on the fixed page at 140.

In this example, assume that the content of document 100 relates to two hypothetical stories designated "1" and "2" contained on fixed page 1 and fixed page 2 (104, 108 respectively). Further, assume that story 1 includes two story fragments and that story 2 includes two story fragments. Document 100 includes a second set of markup or structural markup which identifies individual stories and identifies story fragments of individual stories. In this particular implementation, the structural markup is manifested as a document story section 142, a page 1 story fragments section 144 and a page 2 story fragments section 146.

Document story section 142 provides a mechanism for tracking stories of the document; notably stories that have story fragments on multiple pages. The function of the story tracking mechanism should become clear from the explanation below. In this example, document story section 142 references stories 1 and 2 as indicated generally at 148, 150 respectively. Further, for individual stories 1, 2 the document story section 142 references from story fragments of an individual story to pages upon which the story fragments appear.

For instance, story 1 is composed of a first story fragment 1A as indicated generally at 152 and a second story fragment 1B as indicated generally at 154. Further, the document story section 142 indicates at 156 that story fragment 1A occurs on fixed page 1. Similarly, story fragment 1B occurs on fixed page 2 as indicated at 158. In a similar manner, story 2 is composed of a first story fragment 2A as indicated generally at 160 and a second story fragment 2B as indicated generally at 162. Further, the document story section 142 indicates at 164 that story fragment 2A occurs on fixed page 1. Similarly, story fragment 2B occurs on fixed page 2 as indicated at 166.

The story fragments sections 144, 146 reference individual fixed page parts either directly or by referencing the content markup associated with an individual fixed page part. So for instance, story fragments section 144 references fixed page part 1 (104) and/or fixed page 1 content markup 102. Individual story fragments sections identify story fragments of the individual fixed page part and reference markup elements of the content markup which relate to a particular story fragment. As such the story fragments sections provide a mechanism for associating elements of the content markup with particular stories and story fragments. For example, page 1 story fragments section 144 indicates generally at 170 that story 1 is represented on page 1 by story fragment 1A and that story fragment 1A is conveyed by glyph 1 of fixed content page markup 102. Similarly, as indicated generally at 172, story 2 is represented on page 1 by story fragment 2A which is conveyed by glyph 2 of fixed page content markup 102. Page 2 story fragments section 146 indicates generally at 174 that story 2 is represented on page 2 by story fragment 2B which is conveyed by glyph 3. As indicated generally at 176, story 1 is represented on page 2 by story fragment 1B which is conveyed by glyph 4. In this simplified example the content of individual story fragments is conveyed by a single glyph, but in other instances, multiple glyphs or markup elements may contribute to a story fragment.

The document story section 142 and the story fragments sections 144, 146 serve to identify what stories are contained in fixed layout markup document 100 and on what pages of the document particular stories are expressed. Further, the document story section establishes a reading order for individual stories. For instance, in relation to story 1 indicated at 148, the reading order is story fragment 1A and story fragment 1B as indicated at 152 and 154 respectively. Story fragments sections serve to identify the reading order of content on a particular fixed page. For instance, story fragments section 144 indicates that the reading order for the content of fixed page 1 is story fragment 1A from glyph 1 and then story fragment 2A from glyph 2. In this simplified example the reading order is the same as the markup order in fixed page 1 content markup 102, but in other circumstances the reading order may by different than the markup order. Some examples which serve to illustrate this point are described below.

The illustrated configuration of document 100 provides a mechanism for a document producer, such as application program, to specify story and story fragment information utilizing the document story section 142 and/or the story fragments sections 144, 146. In this configuration, a document consumer, such as an application program can access the story information and the story fragment information on an as needed basis. For example, consider a first scenario where the document consumer is an application program through which a user is interfacing fixed layout markup document 100. Also, consider a second scenario where the document consumer is a print driver which is printing document 100 responsive to a user command.

In the first scenario, the user may desire to select a particular story, such as story 1, from document 100 and paste the story into another document or print the story. The document consumer can access document story section 142 to identify the story fragments that make up story 1 and the fixed pages upon which those story fragments occur. The document consumer can then access only those specified story fragments sections. In this particular instance, story 1 has story fragments on both page 1 and page 2, but in other instances, the document consumer may save resources by accessing only those story fragments sections corresponding to pages upon which a particular story appears.

In this example the document consumer can then access the appropriate story fragments sections 144, 146 to determine which markup elements of the content markup convey the content of story 1. For instance, assume that the user wants to copy story 1 from document 100 into another document. The document story section indicates that story 1 includes first story fragment 1A located on page 1 and second story fragment 1B located on page 2. The document story section further indicates the reading order for the story fragments is 1A then 1B. The document consumer can access the page 1 story fragments section 144 which specifies that story fragment 1A has content conveyed by glyph 1 of the page 1 content markup 102. The document consumer can also access the page 2 story fragments section 146 which specifies that story fragment 1B has content conveyed by glyph 4 of the page 2 content markup 106. The document consumer can copy the content of glyphs 1 and 4 and paste the content into the desired document in the appropriate reading order as defined by the document story section 142.

In the second scenario where the document consumer is printing an entirety of fixed layout markup document 100 and thus may not need the story and story fragment information, the document consumer need not even access the structural markup's document story section 142 and story fragments sections 144, 146. Instead the document consumer can simply print the document based upon the information conveyed by the content markup. Such a configuration can thereby save system resources.

In still another scenario, the user may want to copy the content of fixed layout markup document 100 into another document format which cannot readily utilize the location information associated with the content markup. In such a scenario, the document consumer can utilize the structural markup to maintain the intended reading order of the document content rather than depending on the markup order of the of the content markup. Alternatively, in some such instances, the document consumer can utilize the structural markup to separate the stories so that an entirety of story 1 appears in the new document followed by an entirety of story 2.

For ease of explanation and illustration, the above example utilizes a two page document. However, the skilled artisan should recognize that the described features can be even more valuable for larger documents. Consider for instance, a 5,000 page document. The above description provides a centralized place (e.g. the document story section of the structural markup) which identifies stories of the document and where content of particular stories can be found. For instance, in a hypothetical scenario a user might want to view a story of the document which is conveyed on page 2 and finished on page 5000. Traditionally, the document consumer would have to access all 5000 pages of the document, but with the techniques described above, the document consumer can identify that it need only access content markup associated with a portion of page 2 and a portion of page 5,000.

Consistent with the above examples, some implementations can utilize a story break designator in the structural markup to indicate whether a particular story fragment should be merged with the preceding or following story fragment. Consider for instance, an example where a story has fragment 1 on a first page then the story jumps to a story fragment on a second page before returning to story fragment 3 on the first page. A story break designator at the end of story fragment 1 and/or the beginning of story fragment 3 indicates that though story fragments 1 and 3 appear on the same page the story does not flow from story fragment 1 to story fragment 3. Contrastingly, a lack of a story break designator can indicate that a story flows between two story fragments.

Figure 2:
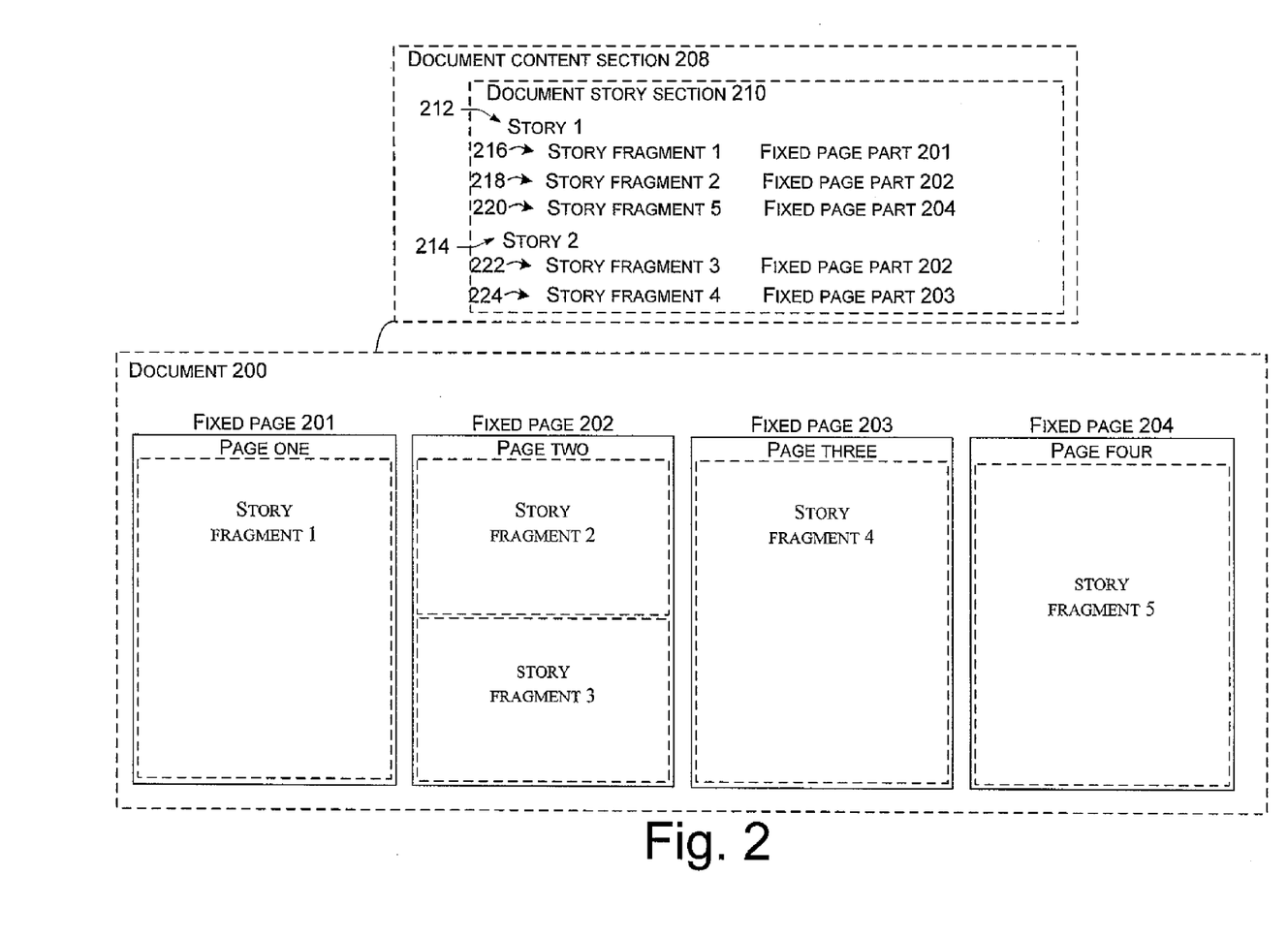

FIG. 2 illustrates a fixed layout markup document 200 which identifies stories contained within the document in accordance with another implementation. This particular fixed layout markup document is generated utilizing an XML Paper Specification (XPS) Document format, developed by Microsoft Corporation of Redmond Wash. Details regarding the XPS Document format are publicly available at least at http://www.microsoft.com/xps. As should be recognized by the skilled artisan, the XPS Document format provides but one example of how markup for story fragments can be achieved. For instance, other implementations could utilize other markup languages with differently named tags and attributes. In one case, tags similar to those shown below for stories could be added to HTML. For example, the HTML tags could by added as part of a page header, as a data structure specified programmatically via a scripting language, or as part of a separate file linked to by a meta tag. A similar markup could be created to denote stories and references to fragments (possibly div tags) within the HTML body that make up the stories.

In the illustrated configuration, fixed layout markup document 200 contains four fixed pages 201, 202, 203, and 204. For sake of brevity, the content markup for generating fixed pages 201-204 is not illustrated. Document 200 includes an associated structural markup. In this instance, the structural markup is manifested as a document content section 208. The document content section 208 identifies story fragments of individual stories in document 200. Since a story can span multiple pages in the document, the document content section identifies which fixed pages contain a portion of a particular story. In this case, identification of the stories is accomplished in a sub-set of the document content section 208 designated as the document story section 210. The document story section describes the stories in fixed layout markup document 200. As indicated in document story section 210, document 200 includes a first story or story 1 indicated at 212, and a second story or story 2 indicated at 214. Document story section 210 further identifies which fixed page parts contain a portion or story fragment of a particular story.

In this particular instance, the document story section 210 identifies that story 1 has a story fragment 1 located on fixed page part 201 as indicated generally at 216, a story fragment 2 located on fixed page part 202 as indicated generally at 218, and a story fragment 5 located on fixed page part 204 as indicated generally at 220. Similarly, story 2 has a story fragment 3 located on fixed page part 202 and a story fragment 4 located on fixed page part 203. As can be evidenced from examining fixed page parts 201-204, story 1 begins on page 1 with story fragment 1 and continues onto page 2 with story fragment 2. Story 1 is then interrupted by story 2 which begins about one-half way down page 2 with story fragment 3. Story 2 continues on to page three as story fragment 4. Lastly, story 1 finishes on page 5 as story fragment 1C. The following schema represents one possible markup technique for implementing the above described document story section configuration of document 200.

```
<DocumentStructure
    xmlns=" http://schemas.microsoft.com/xps/2005/06/document-
    structure">
        <Story Name="Story1">
            <StoryFragmentReferences>
                <StoryFragmentReference
                    Source="StoryFragments1"
                    Page="1"/>
                <StoryFragmentReference
                    Source="StoryFragments2"
                    Page="2"/>
                <StoryFragmentReference
                    Source="StoryFragments 5"
                    Page="4"/>
            </StoryFragmentReferences>
        </Story>
        <Story Name="Story2">
            <StoryFragmentReferences>
                <StoryFragmentReference
                    Source="StoryFragments 3"
                    Page="2"/>
                <StoryFragmentReference
                    Source="StoryFragments 4"
                    Page="3"/>
            </StoryFragmentReferences>
        </Story>
</DocumentStructure>
```

Figure 3:
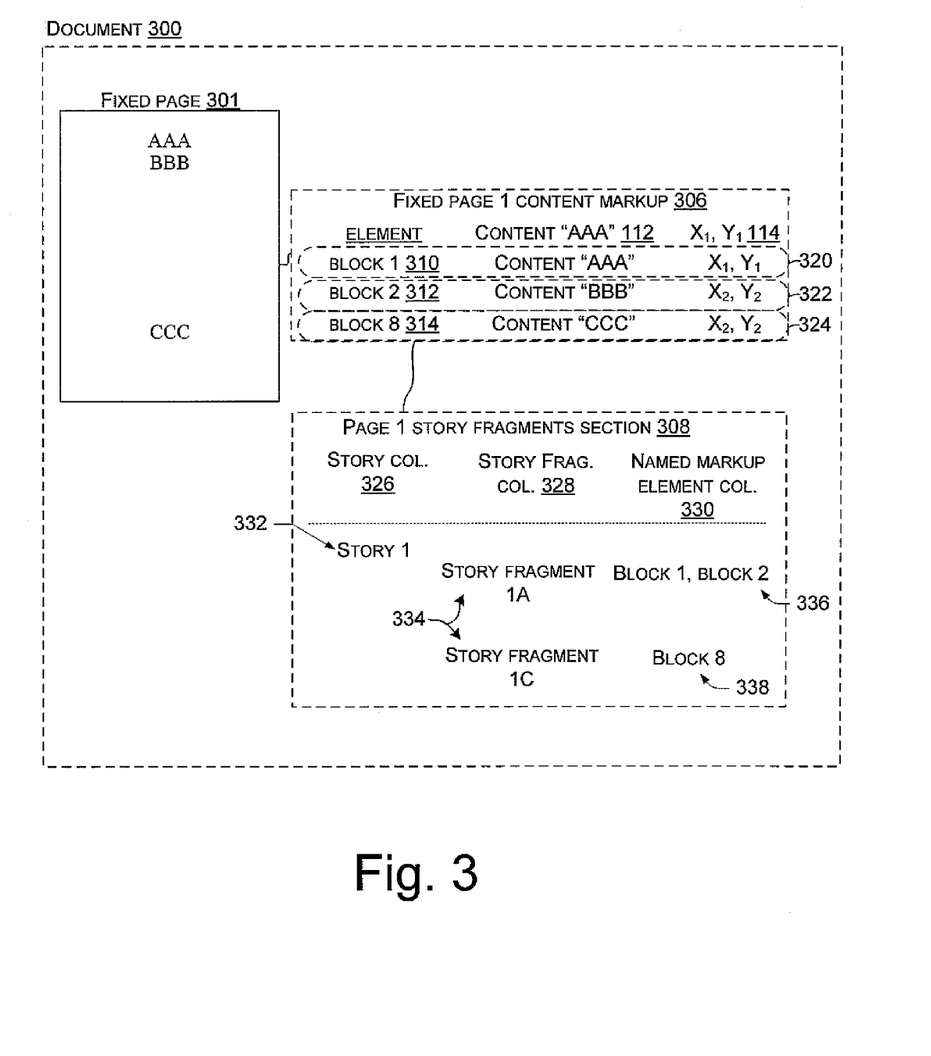

FIG. 3 illustrates another fixed layout markup document 300 which identifies stories contained within the document in accordance with another implementation. In this example a first story begins on a first page of the document with a first story fragment, the story then continues on subsequent pages, which are not specifically illustrated, and finally the story returns to the first page.

Document 300 includes illustrated first fixed page 301. A content markup in the form of a fixed page 1 markup 306 contains the content for fixed page 301. A page 1 story fragments section 308 references the fixed page 1 markup 306.

Fixed page 1 markup 306 includes three markup elements. The markup elements are identified as "block 1" indicated at 310, "block 2" indicated at 312 and "block 8" indicated at 314. As indicated generally at 320, block 1 contains content "AAA" and location data $X_1, Y_1$. Similarly, block 2 contains content "BBB" and location data $X_2, Y_2$ as indicated generally at 322 and block 8 contains content "CCC" and location data $X_3, Y_3$ as indicated generally at 324.

Page 1 story fragments section 308 includes a story column 326, a story fragments column 328, and a named markup element column 330. A single story or story 1 is indicated in the story column as indicated at 332. Two story fragments 1A and 1C relate to story 1 as indicated generally at 334. Two named elements of the content markup (block 1, block 2) convey content of story fragment 1A as indicated at 336. Similarly, a single named element (block 8) conveys content of story fragment 1C as indicated at 338. This particular example illustrates a technique for tracking a story on a particular page as a first story fragment. In this case, the story leaves the page after the first story fragment and subsequently returns to the page for a subsequent story fragment. The story fragments section 308 refers to specific named elements of fixed page 1 markup 306 which convey the stories content. As such a data consumer can utilize the story fragment information conveyed by the story fragments section to obtain the corresponding content from the content markup's fixed page markup 306.

The above described technique can be particularly useful in a scenario where two side-by-side tables extend from page 1 to page 2 of a two page document. The entire document may be a single story, but the natural reading order might be to read all of table A on page 1 continue to page 2 to read the remainder of table A, then return to page 1 to read all of table B on page 1, and finally all of table B on page 2. Without the above described techniques the content is unlikely to be presented to the user in the intended configuration.

The following schema provides an exemplary technique for implementing page 1 story fragments section 308 illustrated in FIG. 3.

```
<StoryFragments
    xmlns="http://schemas.microsoft.com/xps/2005/06/documentstructure">
    <StoryFragment
        StoryName="Story1"
        FragmentName="Fr1"
        FragmentType="Content">
        <StoryBreak />
        <ParagraphStructure>
            <NamedElement NameReference="Block1" />
            <NamedElement NameReference="Block2" />
        </ParagraphStructure>
        <StoryBreak />
    </StoryFragment>
    <StoryFragment
        StoryName="Story1"
        FragmentName="Fr2"
        FragmentType="Content">
        <StoryBreak />
        <ParagraphStructure>
            <NamedElement NameReference="Block8" />
        </ParagraphStructure>
        <StoryBreak />
    </StoryFragment>
</StoryFragments>
```

In summary, the techniques described above provide two underlying features to a fixed layout markup document. First, at least some of the techniques identify stories contained in a fixed layout markup document and where in the document particular stories occur. Second, at least some of the techniques identify story fragments of particular stories and a relative reading order for the document as a whole and for story fragments of a particular story. These techniques can further reference particular named elements of the content markup such that the content can be located by a document consumer.

Exemplary Systems

Figure 4:
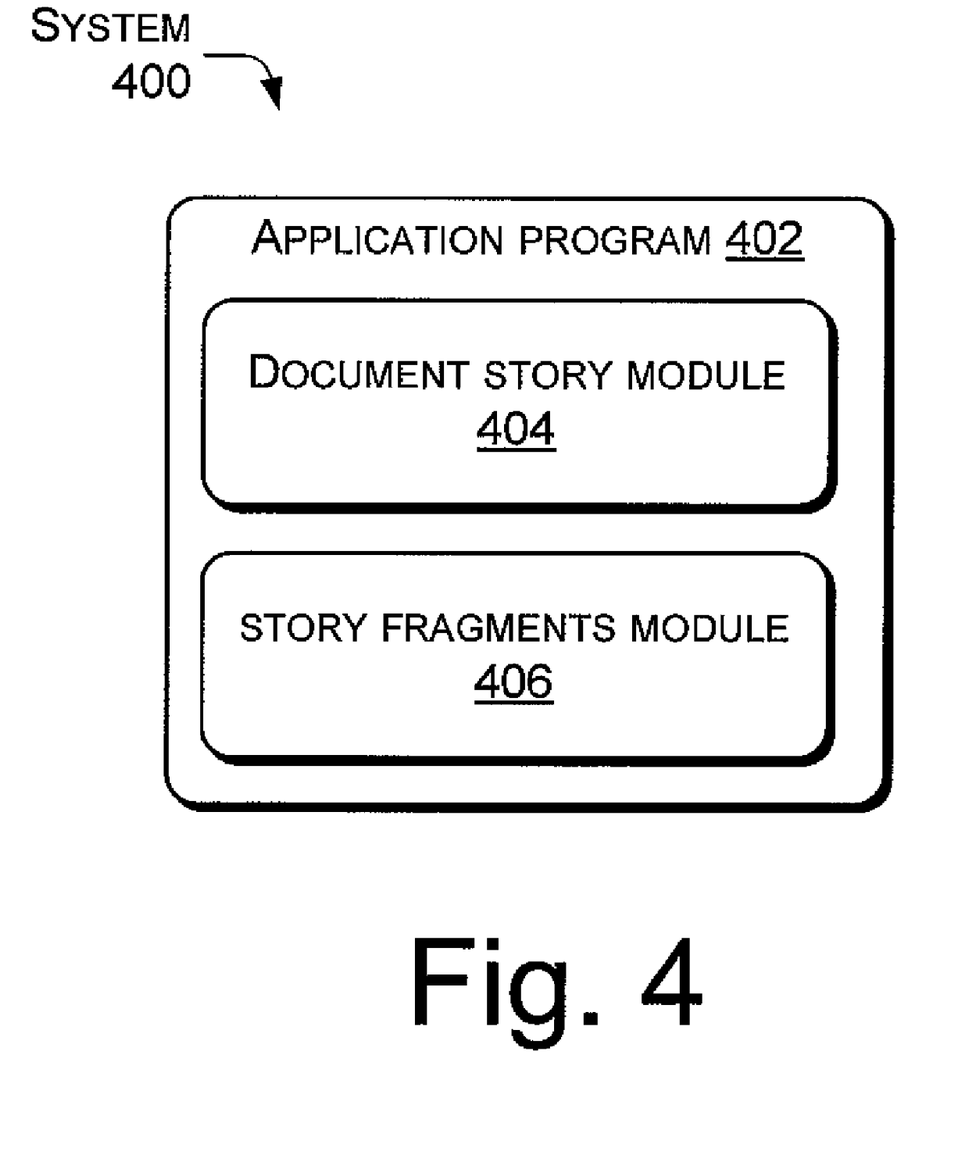
FIG. 4 illustrates components of a system configured to implement story tracking in a fixed layout markup document in accordance with one implementation.

FIG. 4 illustrates a system 400 for generating fixed layout markup documents that have associated story information. System 400 includes an application program 402, a document story module 404, and a story fragments module 406. An example of a contextual environment for system 400 is described below in relation to FIG. 5.

Application program 402 is configured to generate a fixed layout markup document as a set of content markup elements which specify the document's content and positional information for the content relative to the fixed format document. The programmed application may generate the document in various fixed formats such as HTML or XML. In some configurations, application program 402 can be configured to generate the fixed layout markup document as a set of fixed page parts where content is specified as occurring at specific location on a particular page part.

Document story section module 404 is configured to generate a document story section that identifies a story comprising a portion of the content. In at least some instances, the document story section module generates a document story section which reference the content markup which defines the document's content. In scenarios where the document story section is separate from the content markup the document story section can be accessed on an as needed basis by document consumers.

Story fragments module 406 is configured to create a story fragments reference section which identifies story fragments of the story. In instances where the application program creates the document as a set of fixed pages, the story fragments module 406 can create a story fragments reference section for each page of the document. The story fragments reference sections serve to identify story fragments of stories contained on a particular page. The story fragments reference sections can reference named markup elements which convey the content of a story fragment. Such a configuration can allow a document consumer to access the named markup elements to obtain the corresponding content.

The story fragments reference section can also provide a reading order for story fragments contained on the corresponding page. The story fragments reference section can convey the reading order relative to a particular story and/or to multiple stories of a page. For instance, the story fragments reference section can specify that in relation to story 1, a reading order for a given page is story fragment 1A, story fragment 1B, and story fragment 1G. In relation to multiple stories, the story fragments reference section can specify that for a particular page the reading order is story fragments 1A, 1B then story fragment 2A from a second story and finally story fragment 1G from the first story.

Figure 5:
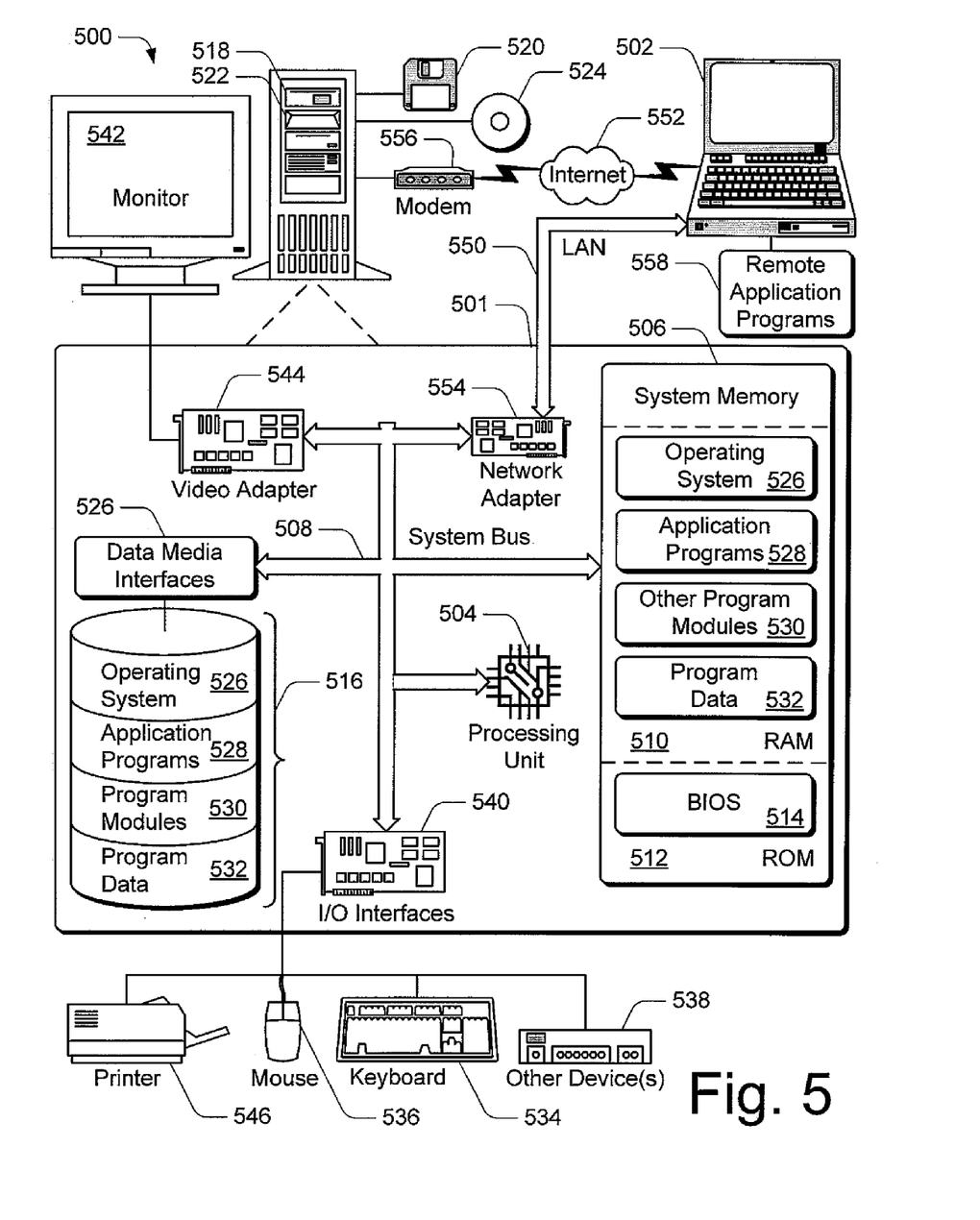
FIG. 5 illustrates exemplary systems, devices, and components in an environment for tracking stories in a fixed layout markup document.

FIG. 5 represents an exemplary system or computing environment 500 upon which story tracking for fixed layout markup documents may be implemented. System 500 includes a general-purpose computing system in the form of a first machine 501 and a second machine 502.

The components of first machine 501 can include, but are not limited to, one or more processors 504 (e.g., any of microprocessors, controllers, and the like), a system memory 506, and a system bus 508 that couples the various system components. The one or more processors 504 process various computer executable instructions to control the operation of first machine 501 and to communicate with other electronic and computing devices. The system bus 508 represents any number of several types of bus structures, including a memory bus or memory controller, a peripheral bus, an accelerated graphics port, and a processor or local bus using any of a variety of bus architectures.

System 500 includes a variety of computer readable media which can be any media that is accessible by first machine 501 and includes both volatile and non-volatile media, removable and non-removable media. The system memory 506 includes computer-readable media in the form of volatile memory, such as random access memory (RAM) 510, and/or non-volatile memory, such as read only memory (ROM) 512. A basic input/output system (BIOS) 514 maintains the basic routines that facilitate information transfer between components within first machine 501, such as during start-up, and is stored in ROM 512. RAM 510 typically contains data and/or program modules that are immediately accessible to and/or presently operated on by one or more of the processors 504.

First machine 501 may include other removable/non-removable, volatile/non-volatile computer storage media. By way of example, a hard disk drive 516 reads from and writes to a non-removable, non-volatile magnetic media (not shown), a magnetic disk drive 518 reads from and writes to a removable, non-volatile magnetic disk 520 (e.g., a "floppy disk"), and an optical disk drive 522 reads from and/or writes to a removable, non-volatile optical disk 524 such as a CD-ROM, digital versatile disk (DVD), or any other type of optical media. In this example, the hard disk drive 516, magnetic disk drive 518, and optical disk drive 522 are each connected to the system bus 508 by one or more data media interfaces 526. The disk drives and associated computer readable media provide non-volatile storage of computer readable instructions, data structures, program modules, and other data for first machine 501.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, application programs 528, other program modules 530, and program data 532 (or some combination thereof) may include an embodiment of the systems and methods described herein.

A user can interface with first machine 501 via any number of different input devices such as a keyboard 534 and pointing device 536 (e.g., a "mouse"). Other input devices 538 (not shown specifically) may include a microphone, joystick, game pad, controller, satellite dish, serial port, scanner, and/or the like. These and other input devices are connected to the processors 504 via input/output interfaces 540 that are coupled to the system bus 508, but may be connected by other interface and bus structures, such as a parallel port, game port, and/or a universal serial bus (USB).

A monitor 542 or other type of display device can be connected to the system bus 508 via an interface, such as a video adapter 544. In addition to the monitor 542, other output peripheral devices can include components such as speakers (not shown) and a printer 546 which can be connected to first machine 501 via the input/output interfaces 540.

First machine 501 can operate in a networked environment using logical connections to one or more remote computers, such as second machine 502. By way of example, the second machine 502 can be a personal computer, portable computer, a server, a router, a network computer, a peer device or other common network node, and the like. The second machine 502 is illustrated as a portable computer that can include many or all of the elements and features described herein relative to first machine 501.

Logical connections between first machine 501 and the second machine 502 are depicted as a local area network (LAN) 550 and a general wide area network (WAN) 552. Such networking environments are commonplace in offices, enterprise-wide computer networks, intranets, and the Internet. When implemented in a LAN networking environment, the first machine 501 is connected to a local network 550 via a network interface or adapter 554. When implemented in a WAN networking environment, the first machine 501 typically includes a modem 556 or other means for establishing communications over the wide area network 552. The modem 556, which can be internal or external to first machine 501, can be connected to the system bus 508 via the input/output interfaces 540 or other appropriate mechanisms. The illustrated network connections are exemplary and other means of establishing communication link(s) between the first and second machines 501, 502 can be utilized.

In a networked environment, such as that illustrated with System 500, program modules depicted relative to the first machine 501, or portions thereof, may be stored in a remote memory storage device. By way of example, remote application programs 558 are maintained with a memory device of second machine 502. For purposes of illustration, application programs and other executable program components, such as the operating system 526, are illustrated herein as discrete blocks, although it is recognized that such programs and components reside at various times in different storage components of the first machine 501, and are executed by the processors 504 of the first machine.

Exemplary Processes

Figure 6:
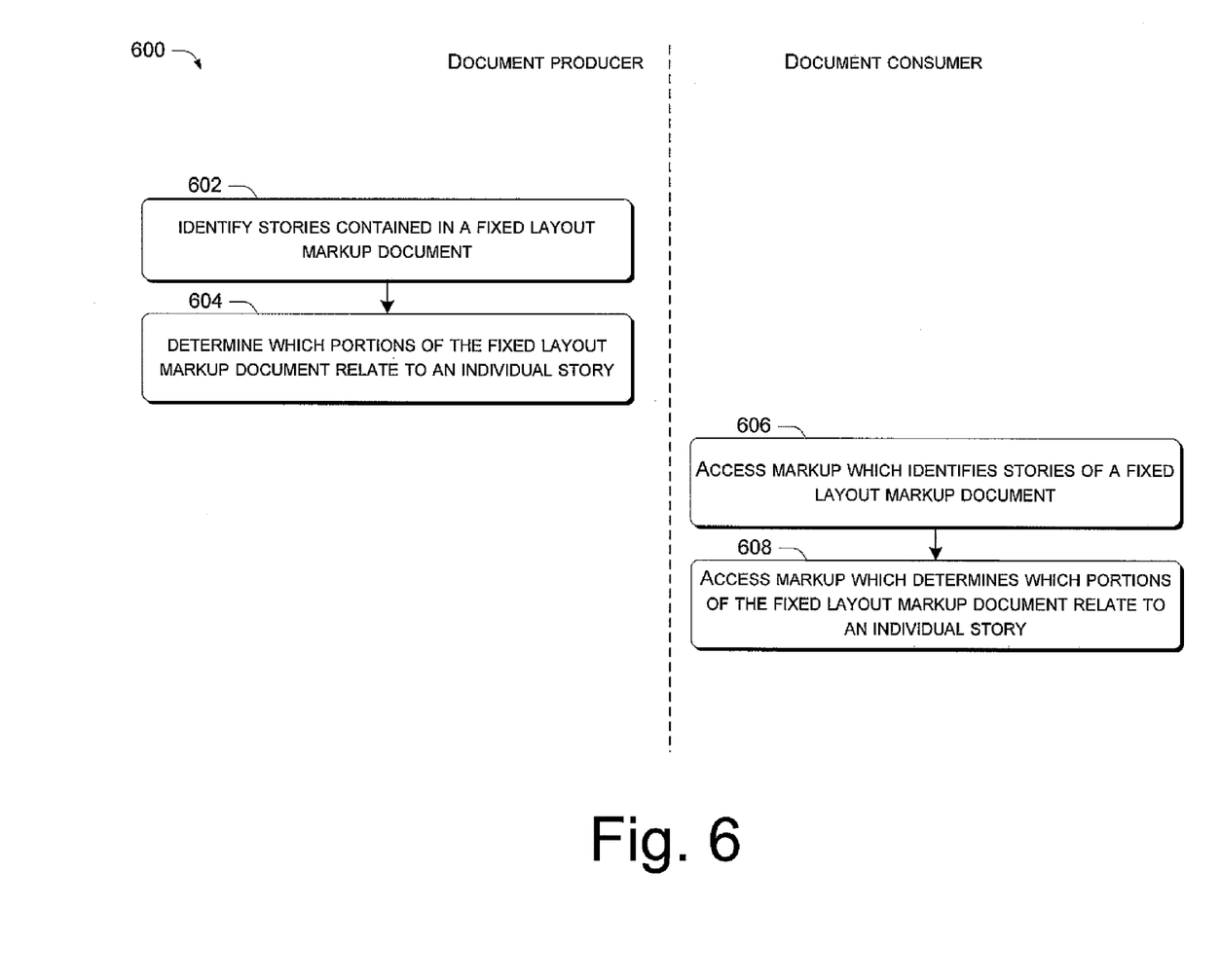
FIG. 6 illustrates an exemplary process diagram relating to story tracking in a fixed layout markup document in accordance with one implementation.

FIG. 6 illustrates an exemplary process 600 related to story tracking of fixed layout markup documents. Process blocks 602 and 604 can be accomplished by a document producer to provide story tracking information for a fixed layout markup document. Process blocks 606 and 608 can be accomplished by a document consumer to derive story tracking information as desired. The order in which the process is described is not intended to be construed as a limitation, and any number of the described process blocks can be combined in any order to implement the process. Furthermore, the process can be implemented in any suitable hardware, software, firmware, or combination thereof.

At block 602 the process identifies stories contained in a fixed layout markup document. This process serves to provide story information which may not otherwise be conveyed by the fixed layout markup document. In some scenarios, the fixed layout markup document can include content markup which conveys the content of the document. In such an instance, some exemplary processes identify the stories without altering the content markup. For instance, the stories can be identified in structural markup which is separate from, but references, the content markup.

In some cases, the fixed layout markup document can be a page based fixed layout markup document which conveys content of the document in content markup associated with individual fixed pages. In these instances, the identifying can specify individual fixed pages upon which a particular story occurs.

At block 604, the process determines which portions of the fixed layout markup document relate to an individual story. At least some of the processes determine specific markup elements of the content markup which convey content of a story or portion of a story. Some processes can generate structural markup which references the content markup and indicates specific named elements of the content markup which relate to an individual story.

At block 606, the process switches to the document consumer side and accesses markup which identifies stories of a fixed layout markup document. In at least some instances, this markup is contained in the document's structural markup. Some implementations allow the document consumer to access the structural markup on an as needed basis. For instance, the structural markup which identifies the stories can be separate and distinct and merely references content markup which conveys content of the fixed layout markup document.

At block 608, the process accesses markup which determines which portions of the fixed layout markup document relate to an individual story. In some instances, the process accesses structural markup which references specific named elements that convey content of the story and provides a reading order for those specific named elements.

Process blocks 606 and 608 can provide story related information to a document consumer to allow the document consumer to accomplish functionalities which might not otherwise be achievable with only the content markup. For instance, by accessing the story related information of process blocks 606 and 608 a document consumer can isolate content markup which conveys content of a particular story and paste that content into another document format while maintaining an intended reading order for the story.

Although implementations relating to story tracking for fixed layout markup documents have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A computer-implemented method, comprising:
identifying, by a computing device, stories contained in a fixed layout markup document, the fixed layout markup document including:
content markup that conveys content of the fixed layout markup document such that a representation of the fixed layout markup document can be generated from the content markup; and
structural markup that references the content markup and identifies a plurality of individual stories and story fragments of the individual stories, the structural markup including a story break designator to indicate whether a particular story fragment should be merged with a preceding story fragment or a subsequent story fragment; and
determining, by the computing device, which portions of the fixed layout markup document relate to an individual story of the plurality of individual stories.

2. The computer-implemented method as recited in claim 1, wherein the identifying comprises generating a story section of the fixed layout markup document which lists the stories and which references portions of the fixed layout markup document related to individual stories.

3. The computer-implemented method as recited in claim 1, wherein content of the fixed layout markup document is conveyed by the content markup and wherein the identifying and the determining comprise generating the structural markup.

4. The computer-implemented method as recited in claim 3, wherein the identifying comprises identifying the stories in a story section and wherein the determining comprises determining the portions in a story fragments section which is referenced from the story section.

5. The computer-implemented method as recited in claim 1, wherein content of the fixed layout markup document is conveyed by content markup elements and wherein the determining comprises specifying individual content markup elements that relate to a story fragment of an individual story.

6. The computer-implemented method as recited in claim 1, wherein the fixed layout markup document comprises individual fixed pages and the content markup which conveys content for the individual fixed pages and wherein the determining comprises generating the structural markup such that the structural markup is associated with individual fixed pages.

7. The computer-implemented method as recited in claim 6, wherein the structural markup associated with individual fixed pages references specific named elements of the content markup.

8. A computer-readable media comprising computer-executable instructions that, when executed, perform acts, comprising:
identifying content of a fixed layout markup document relating to a first story, the fixed layout markup document including:

content markup that conveys content of the fixed layout markup document such that a representation of the fixed layout markup document can be generated from the content markup; and structural markup that references the content markup and identifies a plurality of individual stories and story fragments of the individual stories, the structural markup including a story break designator to indicate whether a particular story fragment should be merged with a preceding story fragment or a subsequent story fragment; and identifying different content of the fixed layout markup document relating to a second story of the plurality of individual stories.

9. The computer-readable media of claim 8, wherein the fixed layout markup document stores the content and the different content as content markup elements and wherein the identifying further comprises generating separate structural markup which reference the content markup elements.

10. The computer-readable media of claim 8, wherein the fixed layout markup document comprises a page-based fixed layout markup document and wherein the identifying are accomplished in respect to individual pages of the page-based fixed layout markup document.

11. The computer-readable media of claim 10 further comprising identifying individual pages on which the first and second stories appear.

12. The computer-readable media of claim 11, wherein identifying individual pages comprises generating a document story section which references the first story to individual pages on which portions of the first story appear and which references the second story to individual pages on which portions of the second story appear.

13. The computer-readable media of claim 12, wherein the portions comprise story fragments including one or more content blocks of an individual page.

14. A computer-implemented system, comprising:
one or more processors;
a programmed application to generate a fixed layout markup document as a set of fixed pages comprising a set of content markup elements, wherein individual content markup elements specify document content and associated positional data for the document content relative to the fixed layout markup document;
a document story module to identify a story comprising a portion of the document content and to generate a document story section that references the individual content markup elements;
a story fragments module to create a story fragments reference section for each page of the fixed layout markup document that identifies story fragments of stories contained on each page, the story fragments reference section further providing a reading order for story fragments contained on each page relative to a particular story and/or multiple stories on each page; and
a story break designator to indicate whether a particular story fragment should be merged with a preceding story fragment or a subsequent story fragment.

15. The system as recited in claim 14, wherein the programmed application is to store the fixed layout markup document as a series of fixed pages, and wherein the story fragments module is to create individual story fragments reference sections for individual fixed pages.

16. The system as recited in claim 15, wherein the document story module is to list stories of the document and to list pages on which individual stories appear.

17. The system as recited in claim 15, wherein the document story module references from an individual story to a corresponding set of story fragments and to pages upon which individual story fragments of the set occur.

18. The system as recited in claim 14, wherein the programmed application comprises the document story module and the story fragments module.

* * * * *